United States Patent
Jackson et al.

(10) Patent No.: US 8,442,215 B2
(45) Date of Patent: *May 14, 2013

(54) DETERMINING HDCP SOURCE KSV SUPPORT

(75) Inventors: Daniel Jackson, Lyndhurst, NJ (US); Yun Mao, Paramus, NJ (US); Robert Carter, New York, NY (US)

(73) Assignee: Crestron Electronics Inc., Rockleigh, NJ (US)

( * ) Notice: Subject to any disclaimer, the term of this patent is extended or adjusted under 35 U.S.C. 154(b) by 294 days.

This patent is subject to a terminal disclaimer.

(21) Appl. No.: 12/833,091

(22) Filed: Jul. 9, 2010

(65) Prior Publication Data

US 2012/0008765 A1    Jan. 12, 2012

(51) Int. Cl.
*H04L 9/00*    (2006.01)
(52) U.S. Cl.
USPC .............................. 380/2; 726/26; 713/162
(58) Field of Classification Search .................. None
See application file for complete search history.

(56) References Cited

U.S. PATENT DOCUMENTS

| | | | |
|---|---|---|---|
| 7,287,282 B2* | 10/2007 | Yamada et al. | 726/26 |
| 2009/0089842 A1* | 4/2009 | Perry et al. | 725/78 |
| 2009/0185682 A1* | 7/2009 | Kellerman et al. | 380/201 |
| 2011/0013772 A1* | 1/2011 | Roethig et al. | 380/200 |

* cited by examiner

*Primary Examiner* — Ghazal Shehni
(74) *Attorney, Agent, or Firm* — Crestron Electronics Inc.

(57) ABSTRACT

Presented is a method for determining the maximum number of key selection vectors (KSVs) supported by an HDCP source. The method includes providing a number of KSVs to the HDCP source, determining whether the HDCP source has entered a failure mode in response to the provided number of KSVs, increasing or decreasing the number of KSVs in response to the HDCP source not entering or entering the failure mode, providing the increased or decreased number of KSVs to the HDCP source, determining whether the HDCP source has entered the failure mode in response to the provided increased or decreased number of KSVs, and repeating the increasing, decreasing, and determining steps until the difference between a lowest number of provided KSVs resulting in the HDCP source entering the failure mode and a highest number of provided KSVs resulting in the HDCP source not entering the failure mode is one.

19 Claims, 5 Drawing Sheets

ABSTRACT/BODY TEXT

DETERMINING HDCP SOURCE KSV SUPPORT

BACKGROUND OF THE INVENTION

1. Technical Field

The present invention generally relates to HDCP Key Selection Vectors (KSVs), and more particularly to determining the number of KSVs that a particular HDCP source can support when connected to an HDCP switch or repeater.

2. Background Art

A typical High-Bandwidth Digital Content Protection (HDCP) system or arrangement, which complies with the High-Bandwidth Digital Content Protection System Specification, the entirety of which is incorporated herein by reference, includes an HDCP source/transmitter, such as a Blu-Ray player, an HDCP repeater, such as a home theater receiver, and one or more HDCP sinks/receiver, such as high definition LCD televisions or monitors.

An HDCP transmitter is a device that can encrypt and transmit HDCP content through one or more HDCP protected interface ports. An HDCP repeater is a device that can receive and decrypt HDCP content through one or more HDCP protected interface ports and can also re-encrypt and transmit HDCP content through one or more HDCP protected interface ports. An HDCP receiver is a device that can receive and decrypt HDCP content through one or more HDCP protected interface ports.

In operation, protected content (e.g., video from a Blu-Ray disc) is transmitted from the HDCP source (i.e., Blu-Ray player), passed through the HDCP repeater (i.e., home theater receiver), and distributed to the HDCP sinks (i.e., televisions and/or monitors).

In order for the HDCP source to transmit protected content through the HDCP repeater and to the HDCP sinks, an authentication process must first occur. According to the HDCP specification, in the authentication process, all devices that receive protected content (i.e., HDCP repeater and sinks) must provide a unique ID called a Key Selection Vector (KSV) to the upstream HDCP source.

During authentication of the HDCP repeater, the HDCP source first reads the HDCP repeater's KSV from registers on the repeater. Thereafter, in order to deliver the KSVs from the downstream sinks to the upstream source, the HDCP repeater reads the KSVs from registers on the downstream HDCP sinks and stores the read KSVs in the repeater's registers, which are read by the upstream HDCP source.

The repeater does not necessarily read a KSV from every downstream sink. For example, a sink may be connected to the HDCP system, but is turned off, or the sink is turned on but protected content is routed to it. The repeater determines that it should read a KSV from a particular sink (i.e., detects the particular sink) when that particular sink is powered on and receives protected content (i.e., has protected content routed thereto).

The HDCP source reads from the registers (disposed in the repeater) each of the KSVs originating from the downstream sinks and checks these KSVs against an HDCP Revocation List maintained by DCP, LLC ("HDCP blacklist") in order to determine if each of the downstream sinks are licensed to receive the protected content. If all the downstream sinks are determined to be licensed to receive the protected content, the upstream source transmits the protected content. The protected content is then encrypted for each point-to-point link (source to sink connection) to prevent any external devices from intercepting and copying the protected content.

HDCP specification delineates that HDCP sources should support 127 downstream KSVs and six layers of HDCP repeaters between the source and any HDCP sinks. However, in practice, many sources support far fewer than 127 KSVs. Depending on the particular manufacturer, a typical source will support between 3 and 24 KSVs.

A problem arises when the HDCP source retrieves (i.e., reads) from the repeater registers more KSVs than it can support. Specifically, when a particular source retrieves more KSVs than it is configured or designed to support, the particular source will stop transmitting content to all downstream sinks. In this case, a user connecting together an HDCP compliant video system is unlikely to realize, or be able to determine, that the reason none of the downstream sinks (e.g., LCDs) display the protected content is because the HDCP source cannot support the number of KSVs retrieved from the repeater registers.

Consequently, there exists a need for an apparatus and a method for determining the number of KSVs a particular HDCP source can support (i.e., the maximum number of downstream HDCP sinks that protected content can be routed to), and routing protected content (i.e., encrypted video) from the HDCP source to no more than the maximum number of supported downstream HDCP sinks so that transmission of protected content to the downstream sinks is not prevented or interrupted.

SUMMARY OF THE INVENTION

It is to be understood that both the general and detailed descriptions that follow are exemplary and explanatory only and are not restrictive of the invention

DISCLOSURE OF THE INVENTION

In one aspect, the invention involves a method for determining the maximum number of key selection vectors supported by a particular High-Bandwidth Digital Content Protection (HDCP) source. The method includes sequentially reading, by the particular HDCP source, a plurality of sets of test key selection vectors, where each of the plurality of sets of test key selection vectors includes a different number of test key selection vectors. The method further includes determining which one or more sets of the read plurality of sets of test key selection vectors do not drive the particular HDCP source into a failure mode, determining which particular set of the one or more sets has the highest number of test key selection vectors, and selecting a value corresponding to the highest number of test key selection vectors as the maximum number of key selection vectors supported by the particular HDCP source.

In one embodiment, the method further includes storing in a memory the value corresponding to the highest number of test key selection vectors of the particular set.

In another aspect, the invention involves a method for determining the maximum number of key selection vectors supported by a particular High-Bandwidth Digital Content Protection (HDCP) source. The method includes a) storing a number of test key selection vectors in at least one register, b) reading, by the particular HDCP source, the number of test key selection vectors from the at least one register, and c) determining whether the particular HDCP source has entered a failure mode in response to reading the number of test key selection vectors. The method further includes d) increasing the number of test key selection vectors stored in the at least one register in response to the particular HDCP source not entering the failure mode, e) decreasing the number of test key selection vectors stored in the at least one register in response to the particular HDCP source entering the failure mode, and f) reading, by the particular HDCP source, the increased or decreased number of test key selection vectors. The method further includes g) determining whether the particular HDCP source has entered the failure mode in response to reading the increased or decreased number of test key selection vectors; and h) repeating steps d)-g) until the difference between a first value corresponding to the lowest number of read test key selection vectors resulting in the particular HDCP source entering the failure mode and a second value corresponding to the highest number of read test key selection vectors resulting in the particular HDCP source not entering the failure mode is one.

In one embodiment, the method further includes i) storing in a memory the value corresponding to the highest number of read test key selection vectors resulting in the particular HDCP source not entering the failure mode as the maximum number of key selection vectors supported by the particular HDCP source.

In another embodiment, step c) further includes determining whether the particular HDCP source has entered the failure mode by determining if the HDCP source transmits stable encrypted video within a predetermined time window in response to the read number of test key selection vectors.

In still another embodiment, step c) further includes determining whether the particular HDCP source has entered the failure mode by determining by visual inspection of a display if the HDCP source transmits stable encrypted video in response to the read number of test key selection vectors.

In yet another embodiment, step c) further includes determining whether the particular HDCP source has entered the failure mode by determining by image analysis if the HDCP source transmits stable encrypted video in response to the read number of test key selection vectors.

In another embodiment, step g) further includes determining whether the particular HDCP source has entered the failure mode by determining if the HDCP source transmits stable encrypted video within a predetermined time window in response to the read increased or decreased number of test key selection vectors.

In still another embodiment, step g) further includes determining whether the particular HDCP source has entered the failure mode by determining by visual inspection of a display if the HDCP source transmits stable encrypted video in response to the read increased or decreased number of test key selection vectors.

In yet another embodiment, step g) further includes determining whether the particular HDCP source has entered the failure mode by determining by image analysis if the HDCP source transmits stable encrypted video in response to the read increased or decreased number of test key selection vectors.

In another embodiment, the method further includes retrieving from the memory the maximum number of key selection vectors supported by the particular HDCP source in response to the particular HDCP source identifying itself.

In still another embodiment, step d) further includes increasing the number of key selection vectors stored in the at least one register in response to the particular HDCP source not entering the failure mode unless the number of read test key selection vectors equals 127. If the number of read test key selection vectors equals 127 and the particular HDCP source has not entered the failure mode, skipping steps d)-h) and storing the number 127 in a memory as the maximum number of key selection vectors supported by the particular HDCP source.

In still another embodiment, step e) further includes decreasing the number of key selection vectors stored in the at least one register in response to the particular HDCP source entering the failure mode unless the number of read test key selection vectors equals 1.

In yet another aspect, the invention involves a High-Bandwidth Digital Content Protection (HDCP) compliant repeater. The repeater includes at least one HDCP source interface configured for communicating with a particular HDCP source, at least one register accessible by the particular HDCP source through the HDCP source interface, and a processor in communication with the at least one HDCP source interface. The processor is configured for a) storing a number of test key selection vectors in the at least one register, b) informing the particular HDCP source that the test key selection vectors are available to be read from the at least one register, c) determining whether the particular HDCP source has entered a failure mode in response to reading the number of test key selection vectors, d) increasing the number of test key selection vectors stored in the at least one register in response to the particular HDCP source not entering the failure mode, e) decreasing the number of test key selection vectors stored in the at least one register in response to the particular HDCP source entering the failure mode, f) informing the particular HDCP source that the increased or decreased number of test key selection vectors are available to be read from the at least one register, g) determining whether the particular HDCP source has entered the failure mode in response to reading the increased or decreased number of test key selection vectors; and h) repeating steps d)-g) until the difference between a first value corresponding to the lowest number of read test key selection vectors resulting in the particular HDCP source entering the failure mode and a second value corresponding to the highest number of read test key selection vectors resulting in the particular HDCP source not entering the failure mode is one.

The repeater further includes a memory configured for storing the value corresponding to the highest number of read test key selection vectors resulting in the particular HDCP source not entering the failure mode as the maximum number of key selection vectors supported by the particular HDCP source.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

LIST OF REFERENCE NUMBERS FOR THE MAJOR ELEMENTS IN THE DRAWING

Figure 1:
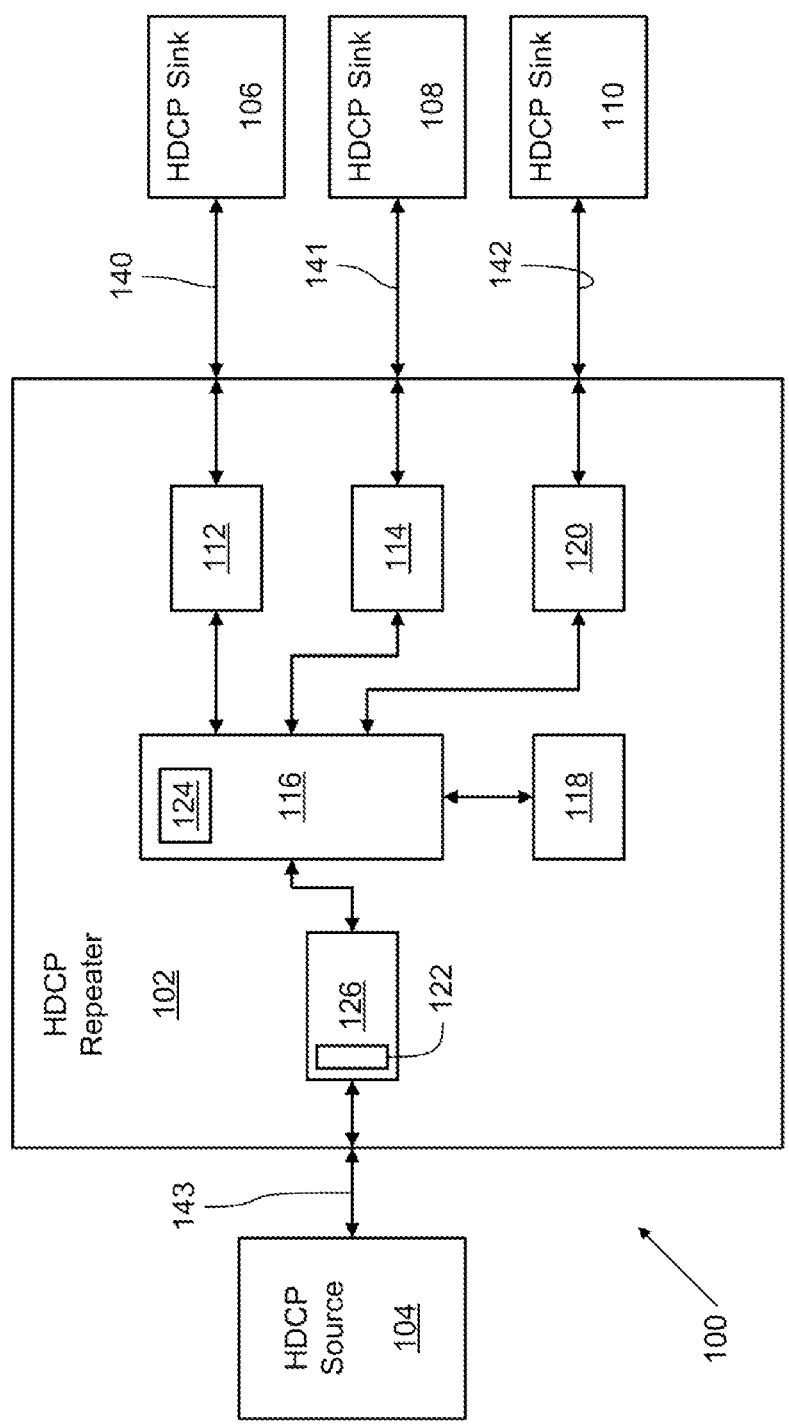
FIG. 1 is an illustrative block diagram of an HDCP repeater in communication with an HDCP source and a plurality of HDCP sinks, according to one embodiment of the invention.

The following is a list of the major elements in the drawings in numerical order.
100 video distribution system
102 HDCP repeater
104 HDCP source 106 HDCP sink
108 HDCP sink
110 HDCP sink
112 transmitter chip
114 transmitter chip
116 processor
118 memory
120 transmitter chip
122 receiver chip registers
124 processor memory
126 receiver chip
202 Turn on source, repeater, and sinks
204 Repeater drives hotplug signal high
206 Source authenticates repeater, starts timer, and polls repeater READY status indicator
208 User initiates KSV determination routine
210 Repeater writes a test set of KSVs to registers
211 Source reads KSVs from registers
212 Does source enter failure mode?
214 Decrease the number of KSVs in the test set
216 Repeater toggles the hotplug signal
218 Source authenticates repeater, starts timer, and polls the repeater READY status indicator
220 Repeater writes the test set of KSVs to registers
221 Source reads KSVs from registers
222 Increase the number of KSVs in the test set
224 Repeater toggles the hotplug signal
226 Source authenticates repeater, starts timer, and polls the repeater READY status indicator
228 Repeater writes the test set of KSVs to registers
229 Source reads KSVs from registers
230 Does source enter failure mode?
232 Is the lowest number of read KSVs resulting in the source entering failure mode—the highest number of read KSVs resulting in the source not entering failure mode=1?
234 Store in memory a number corresponding to the highest number of read KSVs resulting in the source not entering failure mode (the maximum # of supported KSVs)
236 Does source enter failure mode?
238 Is the lowest number of read KSVs resulting in the source entering failure mode—the highest number of read KSVs resulting in the source not entering failure mode=1?
240 Store in memory a number corresponding to the highest number of read KSVs resulting in the source not entering failure mode (the maximum # of supported KSVs)

DETAILED DESCRIPTION OF THE INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

MODE(S) FOR CARRYING OUT THE INVENTION

The present invention involves an apparatus and a method for determining the number of Key Selection Vectors (KSVs) that a particular High-Bandwidth Digital Content Protection (HDCP) source is capable of supporting (i.e., the maximum number of downstream HDCP sinks that protected content can be routed to). The present invention also involves an apparatus and a method for routing protected content from the HDCP source to no more than the maximum number of supported downstream HDCP sinks so that transmission of protected content to the downstream sinks is not prevented or interrupted.

Referring to FIG. 1, a block diagram of a video distribution system 100 employing the method of the present invention is shown. The system 100 includes an HDCP repeater 102 (e.g., a home theater receiver), an HDCP source 104 (e.g., a Blu-Ray player), and a plurality of HDCP sinks 106, 108, 110 (e.g. LCD monitors and/or televisions). The HDCP repeater 102 includes a processor 116, memory 118, transmitting chips 112, 114, 120, receiving chip 126. The processor 116 includes memory 124. The receiving chip 126 includes one or more registers 122.

The HDCP repeater 102 is in communication with the HDCP source 104 and each of the plurality of HDCP sinks 106, 108, 110 via connections 143 and 140-142, respectively. The registers 122 on the receiver 126 are accessible by both the processor 116 and the source 104.

The program of method steps for determining the maximum number of KSVs supported by the source 104 and for routing protected content to no more than the supported number of sinks is implemented using C, C++, or embedded C++ (or other comparable programming language), in firmware that is stored on, and executed by, the processor 116, and is described in detail below.

In the embodiment shown in FIG. 1, the functions of the processor 116, the memory 118, the receiver chip 126, and the transmitter chips 112, 114, 120 are implemented using separate integrated circuit chips. In other embodiments, the functions of the processor 116, the memory 118, the receiver chip 126, and the transmitter chips 112, 114, 120 may be implemented using more or less (e.g., one) integrated circuit chips.

Referring to FIGS. 2A-2D, in one embodiment, flow diagrams of the method steps for determining the number of KSVs that a particular HDCP source can support are shown.

According to the method of the present invention, after the source 104, the repeater 102, and the plurality of sinks 106, 108, 110, are turned on (Step 202), the repeater 102 drives a hotplug signal high to alert the source 104 that there is a device (i.e., the repeater 102) connected thereto (Step 204). The source 104 then executes various video start-up routines, authenticates the repeater 102, reads a repeater bit, starts a watchdog timer, and polls the repeater's 102 READY status indicator either until the READY status indicator is driven high or until five seconds have elapsed, whichever occurs first (Step 206).

If the source 104 and the repeater 102 are being connected together for the first time and, consequently, the number of KSVs supported by the source 104 is not known, a user would initiate the KSV determination routine via pressing a button on the repeater 102 or on a remote control associated with the repeater 102, for example (Step 208).

In response to receiving the indication from the user to start the KSV determination routine, the repeater 102 stores (i.e., writes) in the registers 122 on the receiver chip 126 a first test set of $N_1$ KSVs (Step 210), where $N_1$ can be any number between 1 and 127, and then asserts its READY status indicator. In response to the repeater's READY status indicator being asserted, the source 104 reads the first test set of KSVs from the registers 122 (Step 211). Each KSV in the test set that is stored in the registers 122 is a forty digit binary number that includes twenty "1 s" and twenty "0s". The only requirement for a KSV to quality as an acceptable test KSV is that it not be on the HDCP revocation list.

The repeater 102 then determines if the source 104 has entered a failure mode by checking whether the source 104 begins transmitting stable encrypted video within a predetermined time window (e.g., five seconds) (Step 212). If the source 104 does not begin transmitting stable encrypted video within the predetermined time window, the source 104 is assumed to have entered the failure mode.

For example, in one embodiment, after the repeater 102 asserts its READY status indicator, the repeater monitors the HDCP encryption status every five seconds. If HDCP encryption is inactive, the repeater 102 toggles the hotplug signal to trigger the source to restart authentication five times. If HDCP encryption is still inactive, the repeater 102 determines that the source 104 has entered the failure mode. If HDCP encryption is active, the repeater 102 determines that the source 104 has not entered the failure mode.

If the source 104 has entered the failure mode, the repeater 102 decreases the number of KSVs in the test set to $N_2$ KSVs (i.e., $N_2<N_1$) (Step 214). The repeater then toggles (i.e., drives low then high) the hotplug signal to simulate a cable disconnect and reconnect to initiate the authentication process once again (Step 216).

In response to the hotplug signal being driven high, the source 104 again executes various video start-up routines, authenticates the repeater 102, reads a repeater bit, starts a watchdog timer, and polls the repeater's 102 READY status indicator either until the READY status indicator is driven high or until five seconds have elapsed, whichever occurs first (Step 218). The repeater then stores (i.e., writes) in the registers 122 on the receiver chip 126 the test set of $N_2$ KSVs (Step 220), and then asserts its READY status indicator. In response to the repeater's READY status indicator being asserted, the source 104 reads the test set of $N_2$ KSVs from the repeater's registers 122 (Step 221).

The repeater 102 again determines if the source 104 has entered a failure mode by checking whether the source 104 begins transmitting stable encrypted video within a predetermined time window (Step 230). If the source 104 does not begin transmitting stable encrypted video within the predetermined time window, the source 104 is again assumed to have entered the failure mode, and the repeater 102 again executes Steps 214, 216, 218, 220, 221, and 230, decreasing the number of read KSVs with each iteration, until the source 104 does not enter failure mode. If, however, the source 104 continues to enter failure mode and the number of KSVs is decreased to zero, the source 104 is determined to support zero repeater devices, and the KSV determination routine ends.

If during execution of the determination Step 230, the source 104 does not enter failure mode, the repeater 102 determines if the difference between a first value corresponding to the lowest number of read KSVs in a test set that resulted in the source 104 entering the failure mode and a second value corresponding to the highest number of read KSVs in a test set that resulted in the source 104 not entering failure mode is one (Step 232).

For example, if the lowest number of read KSVs in a test set that resulted in the source 104 entering the failure mode were five, the corresponding first value would be five. Similarly, if the highest number of read KSVs in a test set that resulted in the source 104 not entering failure mode was four, the corresponding second value would be four. Clearly, in this example, the difference between the first value and the second value is one.

If Step 232 is true, the value corresponding to the highest number of read KSVs in a test set that resulted in the source 104 not entering failure mode is the maximum number of KSVs supported by the source 104. This value (i.e., number of supported KSVs) is stored in memory 118 (Step 234). In one embodiment, memory 118 is non-volatile memory (e.g., flash memory) external to the processor 116. In another embodiment, the memory 118 is located on the processor 116.

If Step 232 is not true, the repeater 102 then increases the number of KSVs in the test set, as it would have done if the first test set of $N_1$ KSVs had not forced the source 104 into a failure mode, and is described in detail below.

Referring again to Step 212, if the repeater 102 determines that the source 104 has not entered the failure mode in response to receiving the first test set of $N_1$ KSVs, the repeater 102 increases the number of KSVs in the test set to $N_3$ KSVs (i.e., $N_3>N_1$) (Step 222). The repeater then toggles (i.e., drives low then high) the hotplug signal to simulate a cable disconnect and reconnect to initiate the authentication process once again (Step 224). In response to the hotplug signal being driven high, the source 104 again executes various video start-up routines, authenticates the repeater 102, reads a repeater bit, starts a watchdog timer, and polls the repeater's 102 READY status indicator either until the READY status indicator is driven high or until five seconds have elapsed, whichever occurs first (Step 226). The repeater then stores (i.e., writes) in the registers 122 on the receiver chip 126 the test set of $N_3$ KSVs (Step 228), and then asserts its READY status indicator. In response to the repeater's READY status indicator being asserted, the source 104 reads the test set of $N_3$ KSVs from the repeater's registers 122 (Step 229).

The repeater 102 again determines if the source 104 has entered a failure mode by checking whether the source 104 begins transmitting stable encrypted video within a predetermined time window (Step 230). If the source 104 begins transmitting stable encrypted video within the predetermined time window, the source 104 is again assumed to have not entered the failure mode, and the repeater 102 again executes Steps 222, 224, 226, 228, 229, and 236, increasing the number of read KSVs with each iteration, until the source 104 enters failure mode.

If during execution of the determination Step 236, the source 104 enters failure mode, the repeater 102 determines if the difference between a first value corresponding to the lowest number of read KSVs in a test set that resulted in the source 104 entering the failure mode and a second value corresponding to the highest number of read KSVs in a test set that resulted in the source 104 not entering failure mode is one (Step 238).

If Step 238 is true, the value corresponding to the highest number of read KSVs in a test set that resulted in the source 104 not entering failure mode is the maximum number of KSVs supported by the source 104. This value (i.e., number of supported KSVs) is stored in memory 118 (Step 240). If Step 238 is not true, the repeater 102 then decreases the number of KSVs in the test set, as it would have done if the first test set of $N_1$ KSVs had forced the source 104 into a failure mode, and is described in detail above.

In other words, in order to determine the maximum number of KSVs supported by the source 102, the repeater 102 increases or decreases the number of test KSVs read by the source 104 as necessary until the difference between the lowest number of read test KSVs resulting in the source 104 entering the failure mode and the highest number of read test KSVs resulting in the source 104 not entering the failure mode is one. The highest number of read test KSVs resulting in the source 104 not entering the failure mode is the maximum number of KSVs (and consequently the maximum number of downstream sinks) supported by the source 104.

After the source 104 has been tested, the repeater 102 will not allow content from the source 104 to be routed to more downstream sinks than are supported by the source 104, and therefore will not transmit more downstream KSVs to the source 104 than are supported by the source 104. In doing so, the total number of sinks receiving the protected content is limited, but the source 104 will never enter failure mode because of exceeding its number of supported KSVs limitation.

For example, referring again to FIG. 1, if the maximum number of KSVs supported by the source 104 is two, the repeater 102 will only send two KSVs to the source 104, and only the corresponding two of the three sinks 106, 108, 110, will receive protected content. Even if a user attempts to route content to all three of the sinks 106, 108, 110 connected to the repeater 102, video will still only be routed to two sinks, and therefore, the source 104 will not go into failure mode. The other sink will simply receive no video.

Figure 2A:
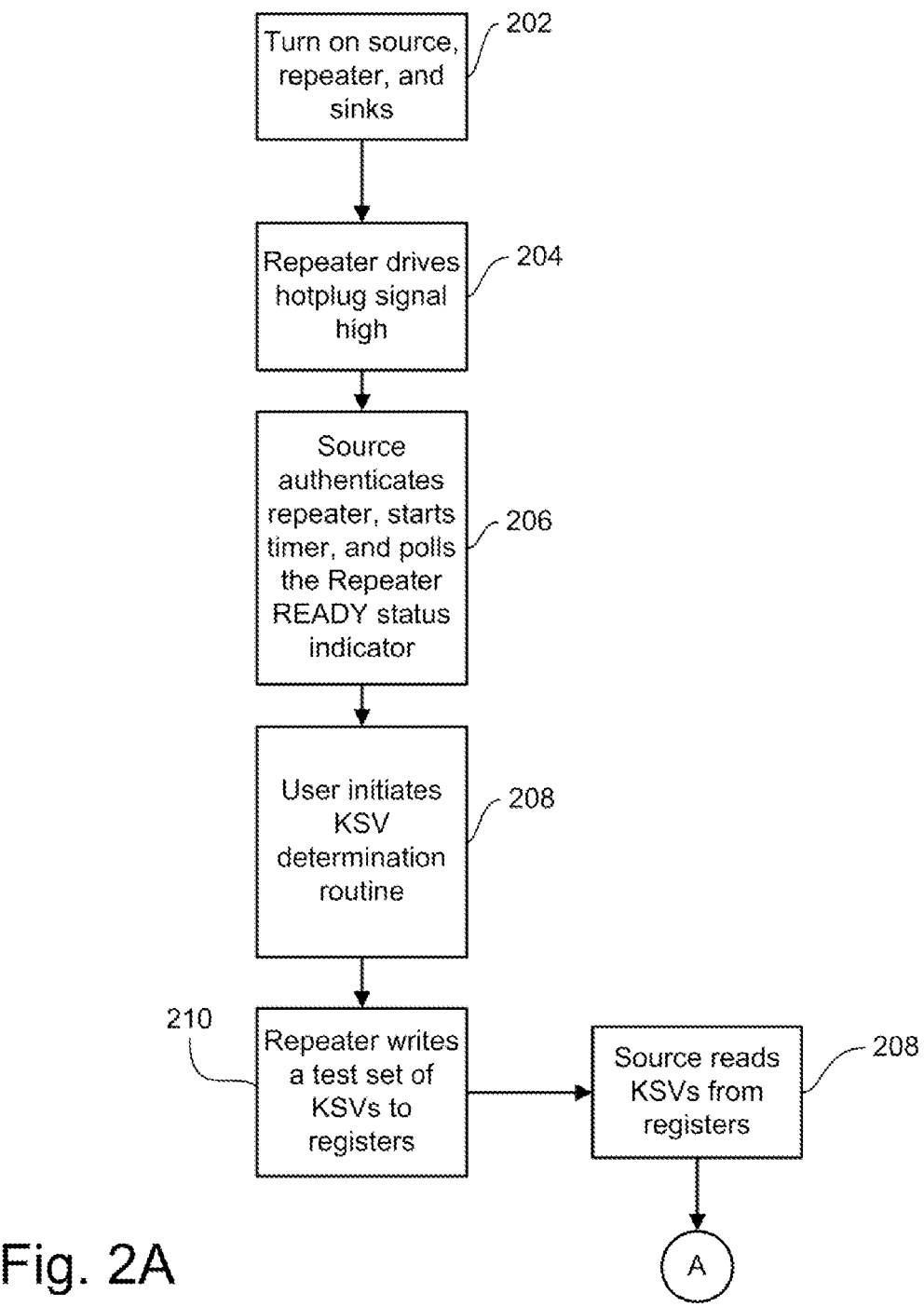
FIGS. 2A-2D are illustrative flow diagrams of steps for determining the number of KSVs that an HDCP source can support, according to one embodiment of the invention.
Figure 2B:
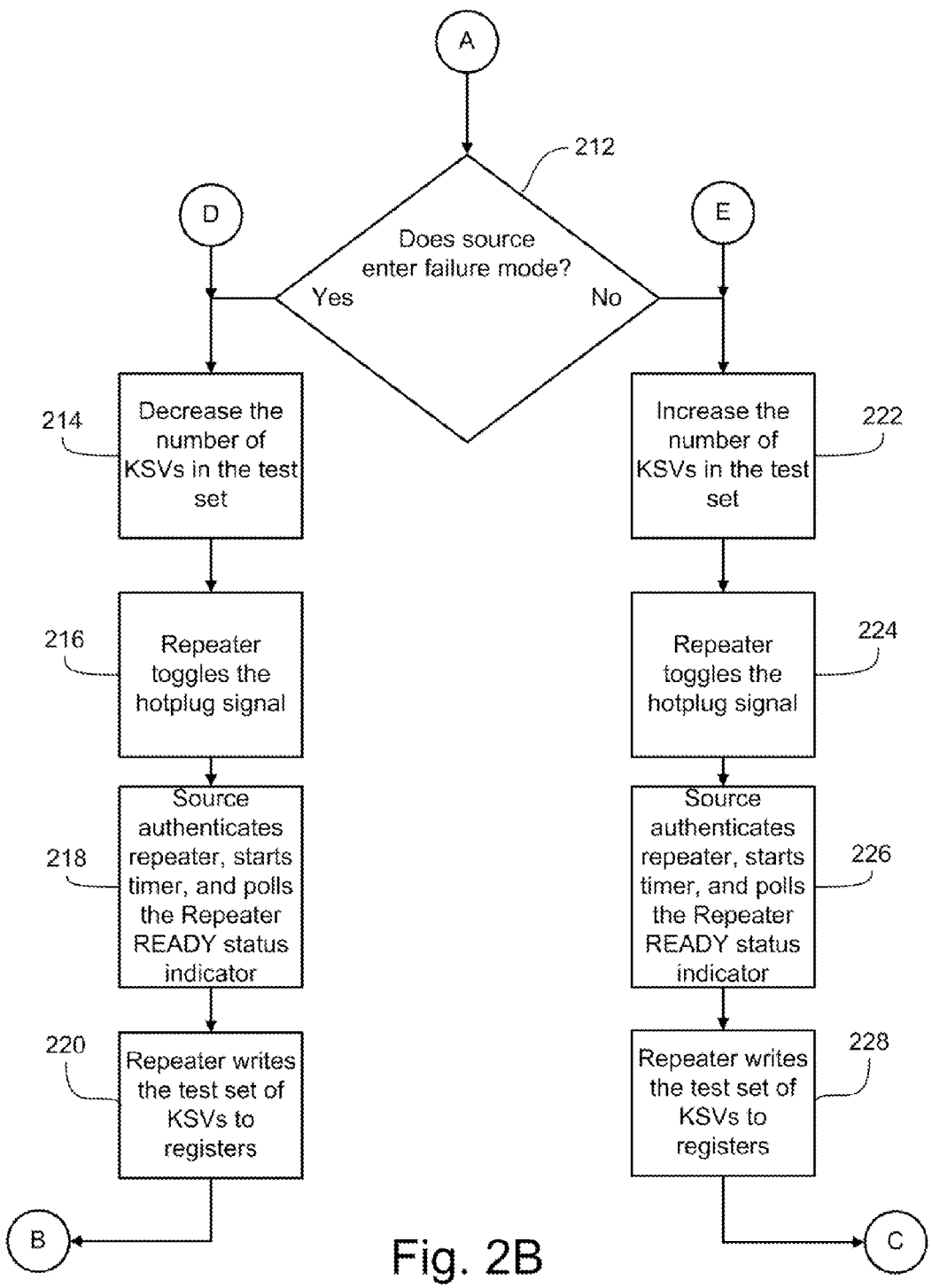
Figure 2C:
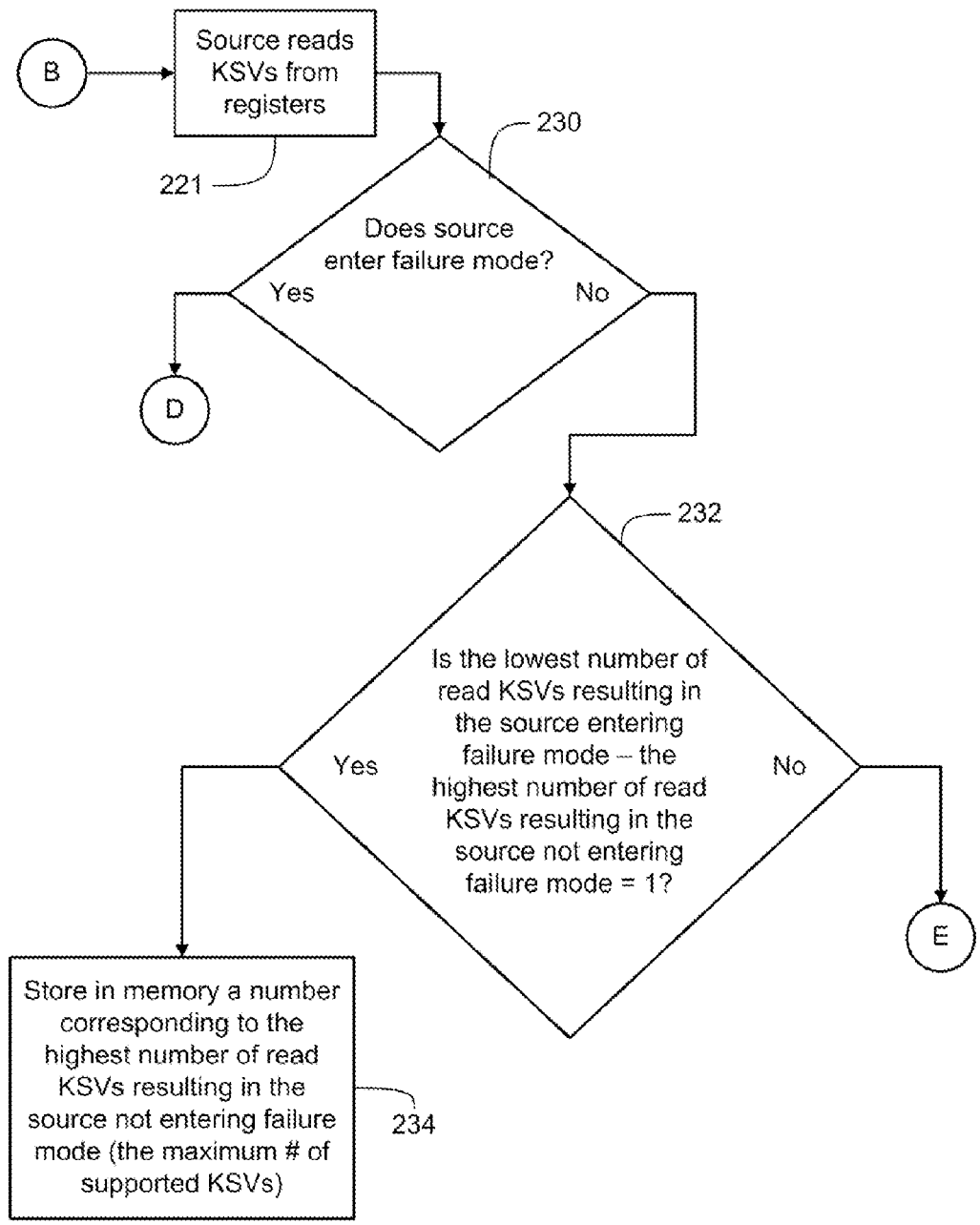
Figure 2D:
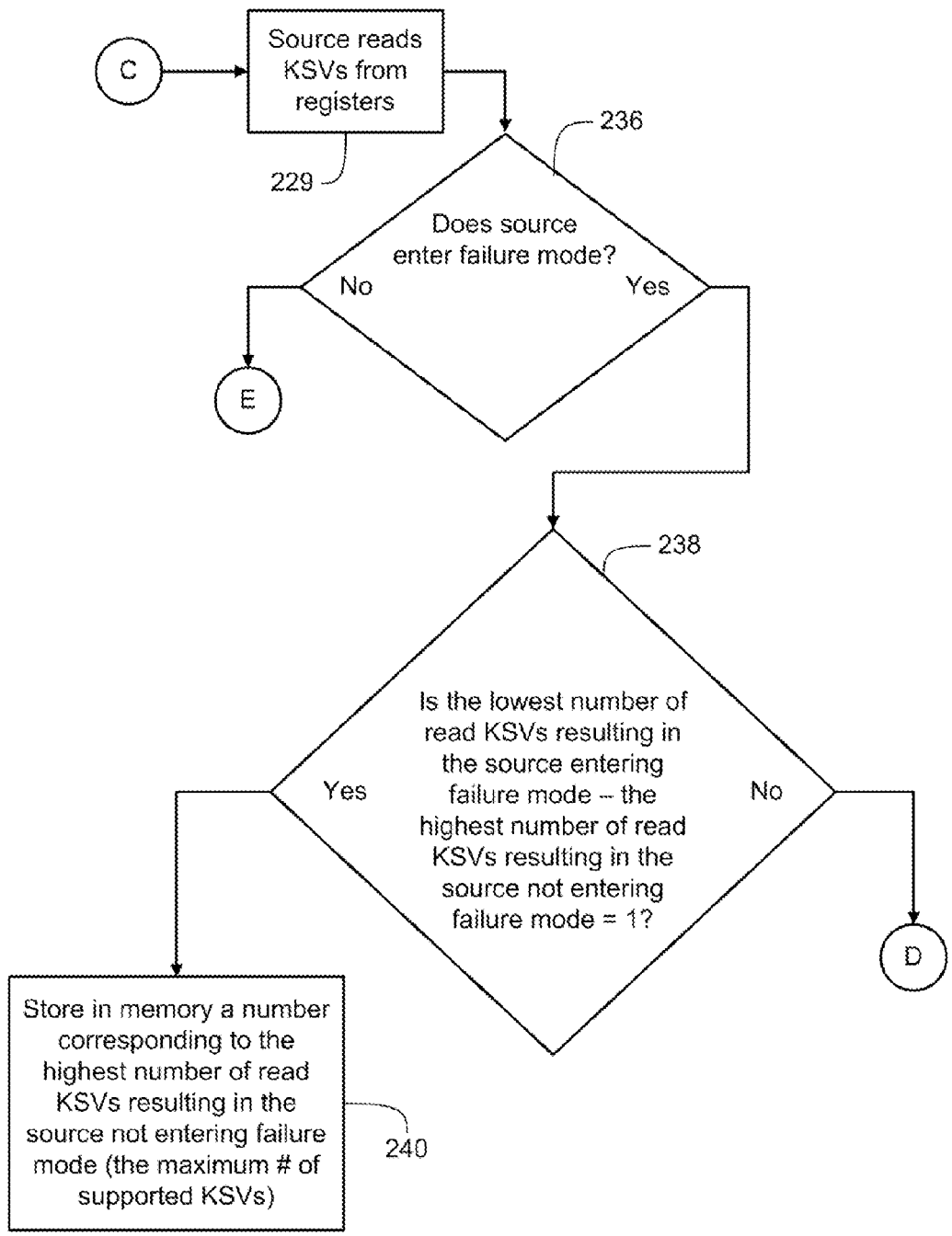

Referring to Steps 214 and 222 in FIG. 2B, the number by which the KSVs in the test set are decreased or increased is a matter of choice. However, some choices/methods are more efficient than others.

In one embodiment, the first test set of KSVs includes 127 KSVs. If this first test set of KSVs results in the source going into a failure mode, the number of KSVs in each subsequent test set of KSVs is chosen to be half the number of KSVs in the previous test set until the source 104 does not enter failure mode. Thereafter, the number of KSVs in a particular test set is increased or decreased to a number that is half way between the number of KSVs in the test set of the most recent pass (i.e., source does not enter failure mode) and the number of KSVs in the test set of the most recent fail (i.e., source enters failure mode).

The number of KSVs in a particular test set continues to be increased or decreased as described above until the difference between a value corresponding to the lowest number of read key selection vectors resulting in the source entering the failure mode and a value corresponding to the highest number of read key selection vectors resulting in the source not entering the failure mode is one As an example of the above-described KSV determination routine, assume that the number of supported KSVs for a particular source is twelve. In order to ascertain this number of supported KSVs using the KSV determination routine, a first test set of 127 KSVs is provided to the particular source (i.e., stored by the repeater in the repeater's registers and subsequently read by the source). According to the method described herein, this test set of KSVs results in the particular source entering a failure mode.

Next, a test set of sixty-three KSVs (approximately half the first number of provided KSVs) is provided to the particular source, which also results in the particular source entering a failure mode. Next, a test set of thirty-one KSVs (again approximately half the number of previously provided KSVs) is provided to the particular source, which again results in the particular source entering a failure mode. Next, a test set of fifteen KSVs (again approximately half the number of previously provided KSVs) is provided to the particular source, which again results in the particular source entering a failure mode. Next, a test set of seven KSVs (again approximately half the number of previously provided KSVs) is provided to the particular source. The test set of seven KSVs results in the particular source not entering a failure mode (i.e., a pass).

Since the test set of seven KSVs resulted in a pass, a test set of eleven KSVs is next provided to the particular source. Eleven is the number of KSVs half way between the number of KSVs resulting in the last pass (i.e., seven) and the number of KSVs resulting in the last fail (i.e., fifteen). The test set of eleven KSVs results in the particular source again not entering a failure mode (i.e., a pass).

Next, a test set of thirteen KSVs is provided to the particular source. Thirteen is the number of KSVs half way between the number of KSVs resulting in the last pass (i.e., eleven) and the number of KSVs resulting in the last fail (i.e., fifteen). The test set of thirteen KSVs results in the particular source entering a failure mode.

Next, a test set of twelve KSVs is provided to the particular source. Twelve is the number of KSVs half way between the number of KSVs resulting in the last pass (i.e., eleven) and the number of KSVs resulting in the last fail (i.e., thirteen). The test set of twelve KSVs results in the particular source not entering a failure mode.

At this point, it can be seen that the difference between a value (i.e., thirteen) corresponding to the lowest number of provided key selection vectors resulting in the particular source entering the failure mode (i.e., thirteen) and a value (i.e., twelve) corresponding to the highest number of provided key selection vectors resulting in the particular source not entering the failure mode (i.e., twelve) is one. Therefore, the value twelve is the maximum number of KSVs supported by the particular source. Additionally, the maximum number of downstream sinks that protected content will be routed to by the repeater is also twelve.

It should be noted that if a test set of 127 KSVs is provided to the source, and the source 104 does not enter a failure mode (i.e., pass), the KSV determination routine stops. This is clearly because 127 KSVs are the absolute maximum number of KSVs that can be supported by a source, according to the current HDCP specification.

In still another embodiment, the first test set of KSVs includes 127 KSVs. With each iteration of the KSV determination routine, the number of KSVs in the test set is decreased by one KSV until the source 104 does not go into a failure mode. Thus, the number of KSVs in the test set provided to the source 104 that results in the source not going into a failure mode is the maximum number of KSVs supported by the source 104.

In yet another embodiment, the first test set of KSVs includes one KSV. With each iteration of the KSV determination routine, the number of KSVs in the test set is increased by one KSV until the source 104 goes into a failure mode. Thus, the number of KSVs in the test set that is provided to the source 104 prior to the test set of KSVs that results in the source 104 going into a failure mode is the maximum number of KSVs supported by the source 104

In the steps described above, the user initiates the KSV determination routine immediately after or during the source 104 authenticating the repeater 102. It should be noted, however, that the user may initiate the KSV determination routine at any time by pressing a button on the repeater 102 (or remote), for example. In this case, no matter where the source 104 and repeater 102 are in the authentication or video transmission processes, the repeater 102 will drive the hotplug signal low to simulate a cable disconnect and then drive the hotplug signal high to simulate a cable reconnect. Thereafter, the KSV determination routine will execute as described hereinabove. Additionally, in other embodiments, rather than toggle the hotplug signal to initiate authentication, the receiver sense (RSEN) signal is instead toggled to initiate authentication.

Also as described in detail above, the KSV determination is manually initiated by the user when the source 104 and repeater 102 are connected together for the first time. Once the maximum number of KSVs supported by the particular source 104 is determined, it is stored in memory 118 and never has to be determined again, even if the source 104 and repeater are powered down, or disconnected and later reconnected.

If a new source B is connected to the repeater 102, the KSV determination routine must be executed to determine the maximum number of KSVs supported by that source B. As described above, that maximum number of supported KSVs is stored in memory 118. Thereafter, if the source B is replaced by the original source 104, the KSV determination routine must be executed again to determine the maximum number of KSVs supported by source 104.

The KSV determination routine needs to be re-executed for the original source 104 because there is no way for the repeater 102 to distinguish between the original source 104 and the new source B. It is the responsibility of the user or installation technician to execute manually the KSV determination routine each time the particular source connected to the repeater is changed. As long as the source connected to the repeater remains the same, the KSV determination routine never needs to be executed a subsequent time.

In another embodiment, the repeater 102 is configured to read vendor information, which identifies the particular source, from info frames that are transmitted to the repeater 102 from the source during the startup routines. In this embodiment, in addition to obtaining (and storing) the maximum number of supported KSVs for the particular source from the KSV determination routine, the repeater 102 also stores the particular source identifying information in memory 118. Consequently, if a particular previously identified source, for which the maximum number of supported KSVs has been determined, is replaced by another source, and then later reconnected to the repeater 102, the KSV determination routine need not be executed again since the particular source is already known and the particular source's maximum number of supported KSVs can be retrieved from memory 118.

Additionally, if a particular source is connected to the repeater 102, and the repeater does not recognize the particular source (i.e., there is no corresponding identifying information stored in memory 118), the repeater 102 automatically executes the KSV determination routine as described in detail above.

In still another embodiment, determining if the source 104 has entered a failure mode is accomplished by human visual inspection of video on a display after each test set of KSVs is read by the source 104. In this embodiment, after the source reads a test set of KSVs, a user or technician would observe a display to determine whether protected content or an error message (or noise) is displayed. If an error message or noise were displayed, the user or technician would execute another iteration of the KSV determination routine.

In yet another embodiment, determining if the source 104 has entered a failure mode is accomplished with image analysis software residing in, and executing on, the repeater 102. In this embodiment, the image analysis software determines whether protected content is successfully being transmitted.

In other embodiments, additional HDCP sources are in communication with an HDCP repeater that is configured to accommodate such additional HDCP sources. In still other embodiments, more or less HDCP sinks are included.

In still another embodiment, all the HDCP testing functions are implemented as a program of instructions stored on a computer-readable medium such as a floppy disk, compact disk, digital video disk, or other portable or removable drive (e.g., a USB thumb drive). The computer-readable medium is accessible by a computer or other processing device, which is configured to execute the program of instructions stored thereon to perform the HDCP source testing functions described in detail hereinabove.

LIST OF ACRONYMS USED IN THE DETAILED DESCRIPTION OF THE INVENTION

The following is a list of the acronyms used in the specification in alphabetical order.
HDCP High-Bandwidth Digital Content Protection
KSV Key Selection Vector
LCD liquid crystal display

ALTERNATE EMBODIMENTS

Alternate embodiments may be devised without departing from the spirit or the scope of the invention.

What is claimed is:

1. A method for determining the maximum number of key selection vectors supported by a particular High-Bandwidth Digital Content Protection (HDCP) source, the method comprising:
  a) sequentially reading, by the particular HDCP source, a plurality of sets of test key selection vectors, each of the plurality of sets of test key selection vectors comprising a different number of test key selection vectors;
  b) determining which one or more sets of the read plurality of sets of test key selection vectors do not drive the particular HDCP source into a failure mode;
  c) determining which particular set of the one or more sets has the highest number of test key selection vectors; and
  d) selecting a value corresponding to the highest number of test key selection vectors as the maximum number of key selection vectors supported by the particular HDCP source.

2. The method of claim 1, further comprising e) storing in a memory the value corresponding to the highest number of test key selection vectors of the particular set.

3. The method of claim 2, further comprising f) routing content from the particular HDCP source to a number of HDCP sinks that is less than or equal to the maximum number of key selection vectors supported by the particular HDCP source.

4. A method for determining the maximum number of key selection vectors supported by a particular High-Bandwidth Digital Content Protection (HDCP) source, the method comprising:
  a) storing a number of test key selection vectors in at least one register;
  b) reading, by the particular HDCP source, the number of test key selection vectors from the at least one register;
  c) determining whether the particular HDCP source has entered a failure mode in response to reading the number of test key selection vectors;

d) increasing the number of test key selection vectors stored in the at least one register in response to the particular HDCP source not entering the failure mode;
e) decreasing the number of test key selection vectors stored in the at least one register in response to the particular HDCP source entering the failure mode;
f) reading, by the particular HDCP source, the increased or decreased number of test key selection vectors;
g) determining whether the particular HDCP source has entered the failure mode in response to reading the increased or decreased number of test key selection vectors; and
h) repeating steps d)-g) until the difference between a first value corresponding to the lowest number of read test key selection vectors resulting in the particular HDCP source entering the failure mode and a second value corresponding to the highest number of read test key selection vectors resulting in the particular HDCP source not entering the failure mode is one.

5. The method of claim 4, further comprising i) storing in a memory the value corresponding to the highest number of read test key selection vectors resulting in the particular HDCP source not entering the failure mode as the maximum number of key selection vectors supported by the particular HDCP source.

6. The method of claim 5, further comprising retrieving from the memory the maximum number of key selection vectors supported by the particular HDCP source in response to the particular HDCP source identifying itself.

7. The method of claim 5, further comprising j) routing content from the particular HDCP source to a number of HDCP sinks that is less than or equal to the maximum number of key selection vectors supported by the particular HDCP source.

8. The method of claim 4, wherein step c) further comprises determining whether the particular HDCP source has entered the failure mode by determining if the HDCP source transmits stable encrypted video within a predetermined time window in response to the read number of test key selection vectors.

9. The method of claim 4, wherein step c) further comprises determining whether the particular HDCP source has entered the failure mode by determining by visual inspection of a display if the HDCP source transmits stable encrypted video in response to the read number of test key selection vectors.

10. The method of claim 4, wherein step c) further comprises determining whether the particular HDCP source has entered the failure mode by determining by image analysis if the HDCP source transmits stable encrypted video in response to the read number of test key selection vectors.

11. The method of claim 4, wherein step g) further comprises determining whether the particular HDCP source has entered the failure mode by determining if the HDCP source transmits stable encrypted video within a predetermined time window in response to the read increased or decreased number of test key selection vectors.

12. The method of claim 4, wherein step g) further comprises determining whether the particular HDCP source has entered the failure mode by determining by visual inspection of a display if the HDCP source transmits stable encrypted video in response to the read increased or decreased number of test key selection vectors.

13. The method of claim 4, wherein step g) further comprises determining whether the particular HDCP source has entered the failure mode by determining by image analysis if the HDCP source transmits stable encrypted video in response to the read increased or decreased number of test key selection vectors.

14. The repeater of claim 13, wherein the processor is further configured for i) routing content from the particular HDCP source to a number of HDCP sinks that is less than or equal to the maximum number of key selection vectors supported by the particular HDCP source.

15. The method of claim 4, wherein step d) further comprises increasing the number of key selection vectors stored in the at least one register in response to the particular HDCP source not entering the failure mode unless the number of read test key selection vectors equals 127.

16. The method of claim 15, further comprising: if the number of read test key selection vectors equals 127 and the particular HDCP source has not entered the failure mode, skipping steps d)-h) and storing the number 127 in a memory as the maximum number of key selection vectors supported by the particular HDCP source.

17. The method of claim 4, wherein step e) further comprises decreasing the number of key selection vectors stored in the at least one register in response to the particular HDCP source entering the failure mode unless the number of read test key selection vectors equals 1.

18. A High-Bandwidth Digital Content Protection (HDCP) compliant repeater, comprising:
at least one HDCP source interface configured for communicating with a particular HDCP source;
at least one register accessible by the particular HDCP source through the HDCP source interface;
a processor in communication with the at least one HDCP source interface, the processor being configured for:
a) storing a number of test key selection vectors in the at least one register;
b) informing the particular HDCP source that the test key selection vectors are available to be read from the at least one register;
c) determining whether the particular HDCP source has entered a failure mode in response to reading the number of test key selection vectors;
d) increasing the number of test key selection vectors stored in the at least one register in response to the particular HDCP source not entering the failure mode;
e) decreasing the number of test key selection vectors stored in the at least one register in response to the particular HDCP source entering the failure mode;
f) informing the particular HDCP source that the increased or decreased number of test key selection vectors are available to be read from the at least one register;
g) determining whether the particular HDCP source has entered the failure mode in response to reading the increased or decreased number of test key selection vectors; and
h) repeating steps d)-g) until the difference between a first value corresponding to the lowest number of read test key selection vectors resulting in the particular HDCP source entering the failure mode and a second value corresponding to the highest number of read test key selection vectors resulting in the particular HDCP source not entering the failure mode is one; and
a memory configured for storing the value corresponding to the highest number of read test key selection vectors resulting in the particular HDCP source not entering the failure mode as the maximum number of key selection vectors supported by the particular HDCP source.

19. A method of limiting the number of key selection vectors transmitted to an HDCP source from connected HDCP sinks to prevent the HDCP source from entering a failure mode, the method comprising:

a) sequentially reading, by the particular HDCP source, a plurality of sets of test key selection vectors, each of the plurality of sets of test key selection vectors comprising a different number of test key selection vectors;
b) determining which one or more sets of the read plurality of sets of test key selection vectors do not drive the particular HDCP source into a failure mode;
c) determining which particular set of the one or more sets has the highest number of test key selection vectors; and
d) selecting a value corresponding to the highest number of test key selection vectors as the maximum number of key selection vectors supported by the particular HDCP source; and
e) routing content from the particular HDCP source to a number of HDCP sinks that is less than or equal to the maximum number of key selection vectors supported by the particular HDCP source.

* * * * *